United States Patent Office 3,215,831
Patented Nov. 2, 1965

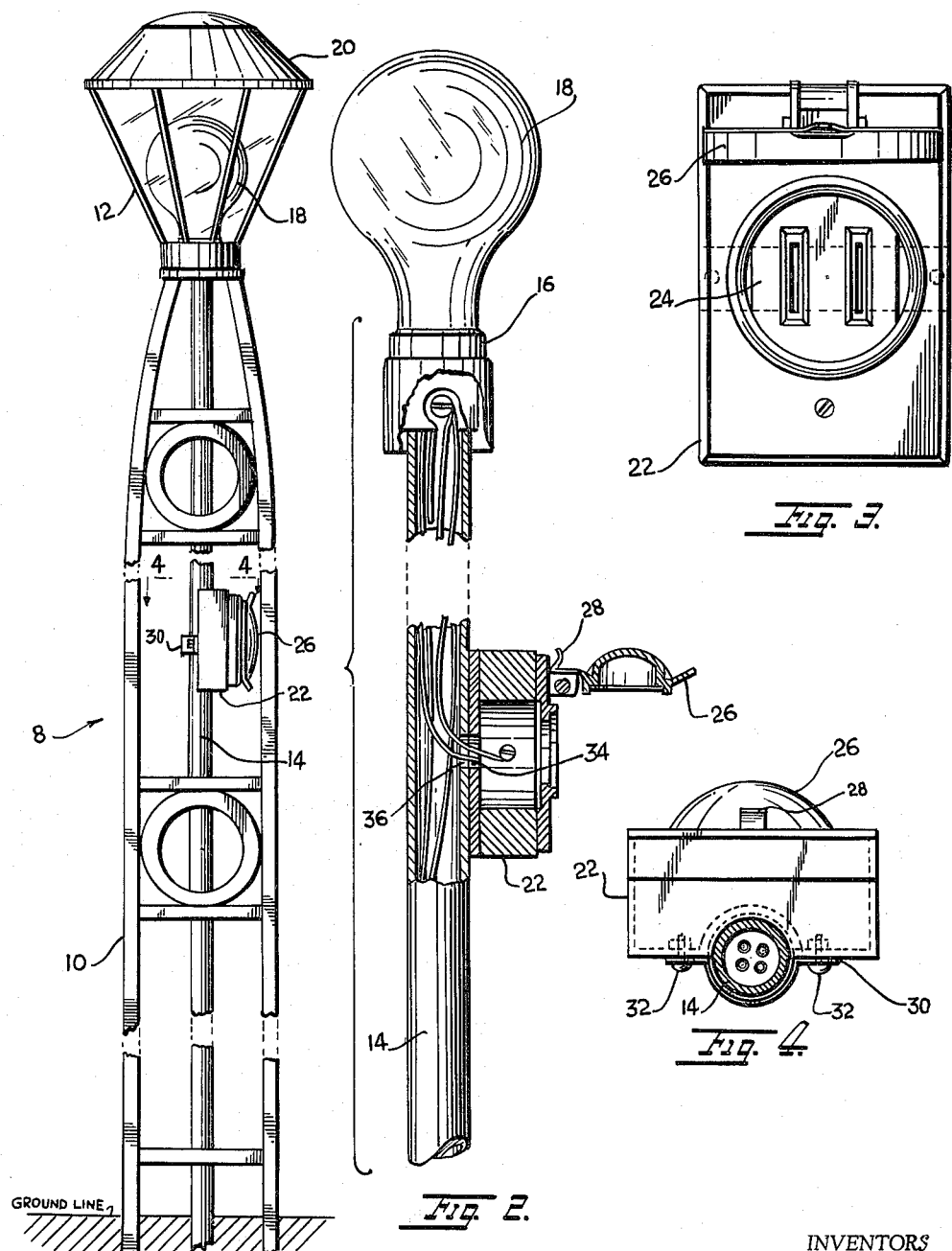

3,215,831
COMBINATION OUTDOOR LAMP-POST AND UTILITY OUTLET
David Gladsden and Lester Gladsden, both c/o Dale Metal Products Co., 1359 Germantown Ave., Philadelphia, Pa.
Filed Jan. 14, 1963, Ser. No. 251,382
1 Claim. (Cl. 240—84)

The present invention relates to an outdoor lamp-post and an enclosed electric utility outlet mounted thereon.

Heretofore, outdoor electric lamp-posts of the ornamental wrought iron type had no means whereby an electric utility outlet could be mounted so as to provide a safe, convenient source of outdoor electrical power.

In the past, the only feasible method for combining a utility outlet with an outdoor lamp-post of the character mentioned was by way of electrical wiring connected to the bulb fixture, or, alternatively, by means of an adapter mounted within the bulb socket. Neither method was entirely satisfactory. The resulting outlet was largely inaccessible and awkward to use. In the case of the adapter, its very proportions precluded proper installation of the lamp-post bulb. Difficulties were encountered with rain leakage.

Accordingly, the present invention provides a permanent electric utility outlet on an outdoor lamp-post of the character described, its location on said lamp-post being selected for handy accessibility and use.

Also, the present invention provides a safe, enclosed outdoor style electric utility outlet mounted on the post portion of an outdoor lamp-post.

Further, the present invention provides the means whereby an electric utility outlet is mounted on the post portion of an outdoor lamp-post of the character described. It will be understood that open framework wrought iron lamp-posts are provided with tubular conduits of relatively small diameter, said conduits carrying the electric wires to the lamp. It has not heretofore been feasible to mount an outlet fixture on such conduit and to tap the wires therein.

The invention is illustrated in the accompanying drawing in which:

FIGURE 1 shows a side view of an open framework, wrought iron outdoor lamp-post including the electric outlet herein claimed mounted thereon.

FIGURE 2 is a partly sectional view showing the wiring of said outlet and lamp and a portion of the lamp-post associated therewith.

FIGURE 3 shows a frontal view of the outdoor electric utility outlet with its protective cover raised thus exposing the receptacle for an electrical plug.

FIGURE 4 is a sectional view of the lamp-post and outlet box taken along line 4—4 of FIGURE 1 and showing therein the box mounting means.

The following comprises a complete description of the invention with reference to the drawing herewith submitted.

The lamp-post 8 embodies an open wrought iron framework 10 the lower end of which is imbedded in the ground or mounted on a base, the upper end of which supports the lamp fixture 12, and a conduit 14 which carries the electric wires up to said lamp fixture. The lamp assembly consists of a bulb socket 16, an electric bulb 18 and a globe or enclosure 20.

Mounted on the conduit 14 is an outdoor style electric utility outlet consisting of a casing 22 which houses a standard female utility outlet or receptacle 24 and is closed by a weathertight gasketed door 26. This door is provided with a spring clip 28 which holds it in an open position when receptacle 24 is in use. The portion of outlet casing 22 which rests against conduit 14 is curved or recessed so as to partially encircle said conduit. A mounting clip 30 has two flat portions which are joined by a curved yoke so as to partially encircle conduit 14 on the opposite side thereof from casing 22. Hence casing 22 and mounting clip 30, when properly placed on opposite sides of conduit 14 almost completely encircle said conduit. Two mounting screws 32 connect casing 22 and clip 30 and, when said screws are tightened sufficiently, cause the casing and clip to clamp securely upon said conduit. A hole or port 34 is provided in the recess of casing 22 and a second hole or port 36 is provided in the wall of conduit 14, said casing hole 34 communicating with said conduit hole 36 when the outlet is mounted as hereinabove described so as to provide a passageway for wires from the interior of conduit 14 to the interior of casing 22.

Bulb 18 and outlet 24 are wired in parallel such that outlet 24 is electrically live at all times regardless of the operating condition of the bulb.

What is claimed is:

An outdoor decorative electric lamp-post of the open, wrought metal type, comprising an open wrought metal frame, a lamp mounted at the upper end of said frame, a conduit extending longitudinally of and within said frame from its lower to its upper end and containing electric wires connected to said lamp and adapted to be connected to a source of electric current, and a weatherproof outdoor electric utility outlet mounted on said conduit and being accessible for use through said open wrought metal frame, said outlet comprising an outlet box having a concave recessed formed in its back wall to receive the conduit, an opening formed in said back wall and a registering opening formed in said conduit, electric conductors extending through said registering openings and being connected at their inner ends to the wires within said conduit and being connected at their outer ends to an electric receptacle mounted within said outlet box, said wires and said conductors being arranged in parallel circuit with each other, and a clamp element extending around the conduit on the side opposite said outlet box, said clamp element being secured to said outlet box and frictionally engaging said conduit, thereby securing said outlet box to said conduit, said outlet box having an outer opening through which the electric receptacle is exposed and being provided with a hinged cover which may be lowered to cover said receptacle and protect it from the elements and which may be raised to expose said receptacle to use.

References Cited by the Examiner

UNITED STATES PATENTS

| | | | |
|---|---|---|---|
| 361,495 | 4/87 | Diall | 240—84 |
| 2,491,448 | 12/49 | Hillenbrand et al. | 240—81 |
| 2,745,949 | 5/56 | Borin | 240—81 |
| 2,881,240 | 4/59 | Seif | 174—58 |
| 3,015,024 | 12/61 | Charchan et al. | 240—84 X |

OTHER REFERENCES

German application 1,092,093, Geya, printed Nov. 3, 1960 (Kl. 21c).

NORTON ANSHER, *Primary Examiner.*